(12) United States Patent
Cox et al.

(10) Patent No.: US 11,030,559 B2
(45) Date of Patent: Jun. 8, 2021

(54) METHOD FOR MAINTAINING A SUPPLY OF AVAILABLE AIRCRAFT EQUIPPED WITH NON-ENGINE DRIVE MEANS FOR USE BY AIRLINES

(71) Applicants: Joseph J. Cox, Portland, OR (US); Rodney T. Cox, North Plains, OR (US); Isaiah W. Cox, London (GB)

(72) Inventors: Joseph J. Cox, Portland, OR (US); Rodney T. Cox, North Plains, OR (US); Isaiah W. Cox, London (GB)

(73) Assignee: Borealis Technical Limited

( * ) Notice: Subject to any disclaimer, the term of this patent is extended or adjusted under 35 U.S.C. 154(b) by 750 days.

(21) Appl. No.: 14/341,763

(22) Filed: Jul. 26, 2014

(65) Prior Publication Data

US 2015/0232202 A1    Aug. 20, 2015

(30) Foreign Application Priority Data

Feb. 14, 2014 (WO) ...................... PCT/US14/16624

(51) Int. Cl.
*B64F 5/00*    (2017.01)
*G06Q 10/06*    (2012.01)
*B64F 5/40*    (2017.01)
*B64C 25/40*    (2006.01)

(52) U.S. Cl.
CPC ......... *G06Q 10/06315* (2013.01); *B64F 5/40* (2017.01); *B64C 25/405* (2013.01); *Y02T 50/80* (2013.01); *Y10T 29/49718* (2015.01)

(58) Field of Classification Search
CPC ................ B60G 17/005; B64C 25/405; G06Q 10/06315; B64F 5/0081; B64F 5/40
USPC ....................................................... 701/34.2
See application file for complete search history.

(56) References Cited

U.S. PATENT DOCUMENTS

| 5,436,027 | A * | 7/1995 | Offer | B05D 1/325 |
| | | | | 427/10 |
| 6,711,548 | B1 * | 3/2004 | Rosenblatt | G06Q 10/02 |
| | | | | 705/5 |
| 8,933,819 | B1 * | 1/2015 | Garrettson | B64D 45/00 |
| | | | | 340/945 |
| 2002/0194037 | A1 * | 12/2002 | Creed | G06Q 10/02 |
| | | | | 705/5 |
| 2003/0055715 | A1 * | 3/2003 | Spence | B64F 5/00 |
| | | | | 705/7.24 |

(Continued)

*Primary Examiner* — Charles A Fox
*Assistant Examiner* — Michael E Butler

(57) ABSTRACT

A method for maintaining a supply of available aircraft equipped with non-engine drive means for autonomous ground movement is provided that enables an air carrier, particularly a low cost carrier, to operate reliably, efficiently, and economically to provide substantially uninterrupted air transport service. The present method is designed to enable airlines with fleets of older aircraft retrofitted with non-engine drive means for autonomous ground movement to operate economically and efficiently through a cooperative arrangement with a maintenance, repair, and overhaul provider that maintains and ensures an available supply network of spare and backup aircraft. The supply network may be global in geographic scope and may provide spare or backup aircraft equipped with non-engine drive means to one or more airlines.

8 Claims, 1 Drawing Sheet

(56) References Cited

U.S. PATENT DOCUMENTS

| | | | | |
|---|---|---|---|---|
| 2003/0109973 | A1* | 6/2003 | Hensey | H04L 63/0853 |
| | | | | 701/32.6 |
| 2008/0263920 | A1* | 10/2008 | Trigg | G09F 3/00 |
| | | | | 40/299.01 |
| 2009/0157532 | A1* | 6/2009 | Shiner | G06Q 10/087 |
| | | | | 705/28 |
| 2009/0222148 | A1* | 9/2009 | Knotts | G05D 1/0038 |
| | | | | 701/2 |
| 2010/0017241 | A1* | 1/2010 | Lienhardt | G06Q 10/0631 |
| | | | | 705/7.12 |
| 2010/0096494 | A1* | 4/2010 | Braier | B64F 1/22 |
| | | | | 244/50 |
| 2010/0114616 | A1* | 5/2010 | Touati | B60R 25/2018 |
| | | | | 705/5 |
| 2012/0018574 | A1* | 1/2012 | Bayer | B64C 25/405 |
| | | | | 244/50 |
| 2012/0035965 | A1* | 2/2012 | Maguire | G06Q 10/02 |
| | | | | 705/5 |
| 2012/0327378 | A1* | 12/2012 | Harvey | G03B 21/145 |
| | | | | 353/52 |
| 2013/0020430 | A1* | 1/2013 | Cox | B64C 25/405 |
| | | | | 244/50 |
| 2013/0112807 | A1* | 5/2013 | Cox | B64C 25/36 |
| | | | | 244/50 |
| 2013/0264415 | A1* | 10/2013 | Ribarov | B64C 25/405 |
| | | | | 244/50 |
| 2014/0329055 | A1* | 11/2014 | Berry | B05D 1/32 |
| | | | | 428/174 |
| 2015/0027010 | A1* | 1/2015 | Mansfield | G09F 19/14 |
| | | | | 40/215 |
| 2015/0042494 | A1* | 2/2015 | Garrettson | G09F 21/08 |
| | | | | 340/945 |
| 2017/0257606 | A1* | 9/2017 | Walke | H04N 9/3141 |

* cited by examiner

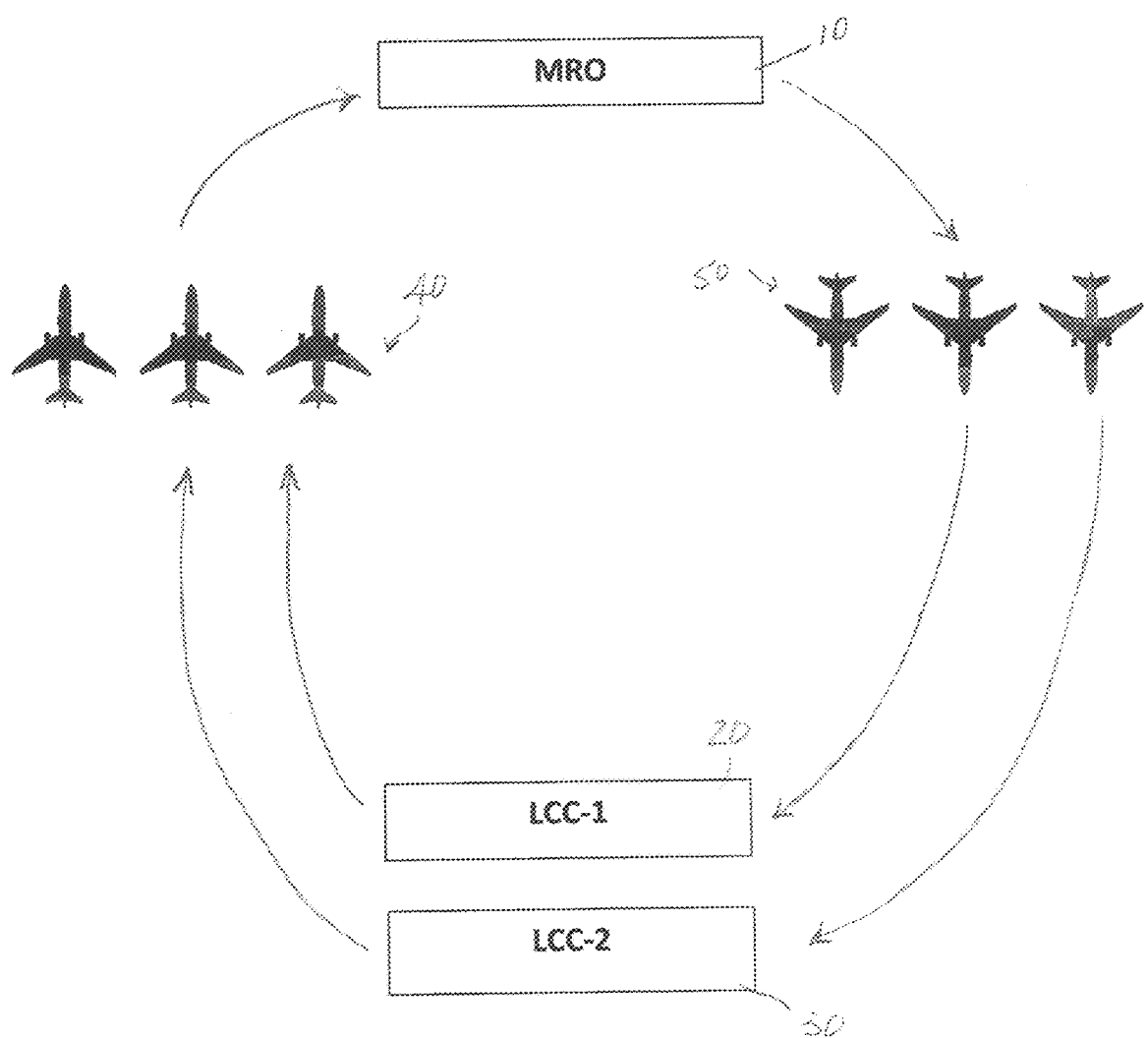

METHOD FOR MAINTAINING A SUPPLY OF AVAILABLE AIRCRAFT EQUIPPED WITH NON-ENGINE DRIVE MEANS FOR USE BY AIRLINES

PRIORITY CLAIM

This application claims priority from International Patent Application No. PCT/US2014/016624, filed 14 Feb. 2014, now withdrawn, the disclosure of which is fully incorporated herein by reference.

TECHNICAL FIELD

The present invention relates generally to methods for maintaining supplies of aircraft ready for use by airlines and specifically to a method for maintaining and ensuring the availability of a supply of aircraft equipped with non-engine drive means that is ready for use by one or more low cost or other air carriers.

BACKGROUND OF THE INVENTION

The airline industry has seen the growth of an increasing number of airlines described as low cost carriers (LCC). Low cost carriers typically offer lower fares and fewer services than other airlines known as legacy carriers. Low cost carriers may operate without such onboard equipment as reclining seats or audio or video entertainment equipment, for example. Additional revenue may be generated by charging passengers fees for onboard services, such as priority boarding or carrying on baggage. Most low cost carriers tend to use a single type of aircraft, and these are often older aircraft, although low cost carriers may also operate newer, more fuel efficient aircraft. The use of a standardized fleet of aircraft can produce cost savings for low cost carriers, primarily from reduced training and maintenance costs and bulk purchasing discounts. In addition to a less complex fleet of aircraft, LCCs usually provide service through a less complex route network than legacy carriers.

Low cost carriers may provide the only regional air transport service in many countries. When a low cost carrier has a small fleet of older aircraft, even if they are all the same type of aircraft, these aircraft are likely to require more maintenance than newer aircraft and may be unavailable for use for longer periods of time. Spare aircraft may not be available when needed, and an LCC's service capability may be adversely impacted by the lack of a supply of available aircraft.

The useful life of an aircraft can be affected by many factors and is often difficult to predict. Although the earliest generation of jet aircraft had relatively short useful lives in the range of 10 to 20 years, or even less, today's jet aircraft are in service significantly longer. Some studies show 30 to 35 years to be the median length of service before an aircraft is retired. The average age of many, if not most, airlines' fleets of aircraft has increased and is likely to continue to do so for the foreseeable future. This is particularly true of low cost carriers. These low cost carriers have tended to purchase used aircraft, with the result that older aircraft are kept operating longer than would have been the case in the not too distant past.

All airlines, and particularly low cost carriers, are currently under pressure to maximize operation and profitability of their existing fleets while reducing the costs of flying. Additional pressures are being applied on airlines to increase fuel efficiency, reduce greenhouse gas emissions, and generally minimize the impact of aircraft on air quality and climate change. Since aging aircraft are less fuel efficient and may lack the technology to reduce emissions, these pressures are presenting significant challenges to low cost and other airline operators. Many low cost carriers lack the funding required to order or option new replacement aircraft, and these airlines continue to look for possible ways to maintain and extend the useful economic lives of their aging fleets so that they may continue to provide service.

A significant factor in effectively operating older aircraft is the availability and cost of fuel. Older aircraft are typically less fuel efficient than newer aircraft. The cost of maintenance for older aircraft is also a consideration. Maintenance and inspection requirements, moreover, tend to be more extensive for older aircraft. Fuel and maintenance costs notwithstanding, there are economic advantages associated with extending the useful life of an older aircraft rather than replacing it with a new one. A new commercial jet aircraft, such as a Boeing 737-800, in the present market can cost in the neighborhood of US$50 to US$70 million and more. A fully equipped and outfitted aircraft may even list in the US$100 million range, although the actual sale price may be discounted. While the fuel savings and maintenance advantages are desirable, an investment of this magnitude can take a significant amount of time before a return on the investment is realized. In contrast, an older aircraft can be brought up to date for a fraction of the purchase price of a fully equipped new aircraft, typically about US$4 to US$5 million, although the cost could be much greater if the aircraft is re-engined. While many improvements can be made to modernize older aircraft, those that make an aircraft more cost-efficient to operate and extend its useful life are the most desirable and generally cost the most money. These are costs that many low cost carriers have challenges undertaking.

Low cost carriers with fleets of older aircraft can be faced with insufficient numbers of aircraft to provide expected service if maintenance demands cause aircraft to be removed from operation. At present, there is not a supply of spare well-maintained and efficient older aircraft ready and available for use by low cost or other carriers in this situation. Providing a supply of aircraft that are ready for operation when needed as spares or replacements for aircraft requiring service could ensure that a low cost or other carrier can maintain an expected level of service. The Fleet Management Solutions system offered by Sikorski Aerospace Services and described at www.sikorski.com/Service+&+Support/Commercial+Rotary provides centralized maintenance information and insurance specifically for Sikorski aircraft to improve readiness and availability and to reduce maintenance cost for these helicopters. This centralized support system can track maintenance requirements, maintenance progress, and the availability of maintained aircraft for a single manufacturer of specialized aircraft. However, its applicability for ensuring that a low cost carrier or other airline has effective access to a ready supply of efficiently operating aircraft available for use on an as-needed basis is limited.

The art has not adequately addressed major concerns of reducing maintenance or achieving fuel savings in older aircraft, which is essential to the efficient operation of many low cost carriers. The possibility of not only saving fuel, but also of extending an aircraft's useful and/or economic life by retrofitting older aircraft with a fuel and cost-saving drive wheel assembly that employs non-engine drive means to move the aircraft autonomously on the ground while minimizing aircraft exposure to factors that shorten aircraft effective operating life is presently not available to low cost or other carriers.

The prior art, moreover, does not suggest a method whereby a supply of efficiently operating older aircraft equipped with non-engine drive means for autonomous ground movement can be maintained at selected geographic locations in a condition available for use by low cost or other carriers when needed so that airline service can be provided substantially without interruption as scheduled and expected. The prior art, while acknowledging the desirability of extending the useful life of aircraft so that older aircraft may be kept in service longer, also fails to suggest a method for providing a reliable global fleet of older, or newer, aircraft equipped with non-engine drive means that is accessible when needed for use as spare or backup aircraft by low cost or other airline carriers.

SUMMARY OF THE INVENTION

It is a primary object of the present invention therefore, to provide a method for maintaining a supply of efficiently operating aircraft equipped with non-engine drive means for autonomous ground movement at selected geographic locations in a condition available for use by low cost or other airlines when needed so that airline service can be provided substantially without interruption as scheduled and expected.

It is another object of the present invention to provide a method for providing a reliable global fleet of aircraft equipped with non-engine drive means that is accessible when needed for use as spare or backup aircraft by low cost or other air carriers.

It is an additional object of the present invention to provide a method for ensuring the availability of a network of readily available efficiently operating spare aircraft equipped with non-engine drive means for one or a number of airlines.

It is a further object of the present invention to provide a network of efficiently operating aircraft equipped with non-engine drive means available as backup aircraft for multiple airlines in selected locations.

It is yet another object of the present invention to provide a method for maintaining a supply of available aircraft equipped with non-engine drive means for use by low cost or other air carriers that includes an arrangement between a carrier and a maintenance, repair, and overhaul provider wherein the maintenance, repair, and overhaul provider maintains, pre-positions, and operates a reserve fleet of aircraft equipped with non-engine drive means for autonomous ground movement available for service when needed by the carrier.

It is yet an additional object of the present invention to provide a method for operating a low cost carrier with a fleet of older aircraft equipped with non-engine drive means, wherein utilization risk is pooled with a maintenance, repair, and overhaul provider that maintains and provides a global supply of spare aircraft.

It is yet a further object of the present invention to provide a method whereby a low cost carrier and a maintenance, repair, and overhaul provider cooperatively provide reliable, efficient, and economic air travel service.

It is a still further object of the present invention to provide a method for operating low cost airline carriers wherein a low cost carrier is responsible for and performs marketing, sales, and ticket operations, and a maintenance, repair, and overhaul provider provides a readily available reliable supply of conveniently located aircraft equipped with non-engine drive means and pilots capable of operating these aircraft available for use by one or more low cost carriers.

It is a still further object of the present invention to provide a method for providing a pool of aircraft equipped with non-engine drive means available to any airline requiring a spare or backup aircraft, thereby enabling airlines to reduce their fleets of standby or spare aircraft.

In accordance with the aforesaid objects, the present invention provides a method for maintaining a supply of available aircraft equipped with non-engine drive means for autonomous ground movement that enables an air carrier, particularly a low cost carrier, to operate reliably, efficiently, and economically to provide uninterrupted air transport service. The present method is designed to enable airlines with fleets of older aircraft equipped with non-engine drive means for autonomous ground movement to operate economically and efficiently with minimal or no service interruption through a cooperative arrangement with a maintenance, repair, and overhaul provider that maintains a supply network of spare and backup aircraft. The supply network may be global in geographic scope and may provide spare or backup aircraft equipped with non-engine drive means to one or more airlines. Since any airline may have access to this pool of non-engine drive means-equipped aircraft, airlines will be able to reduce the number of aircraft they typically keep available as standby or spare aircraft.

Other objects and advantages will be apparent from the following description, claims, and drawings.

BRIEF DESCRIPTION OF THE DRAWINGS

FIG. 1 is a diagrammatic representation of one possible embodiment of the method of the aircraft maintenance and supply method of the present invention wherein an MRO has an arrangement with two different low cost carriers.

DESCRIPTION OF THE INVENTION

As indicated above, low cost carriers tend to rely on older aircraft to make up the bulk of their fleets. Since these older aircraft tend to require more frequent maintenance than newer aircraft, the likelihood that aircraft may be unavailable when needed is greater than for airlines with a high percentage of newer aircraft. The unavailability of aircraft may be accompanied by significant negative impact on an airline, especially a low cost carrier, which may not be able to support the cost of a fleet of extra aircraft on standby to use as spares. The need for backup aircraft by airlines is not always predictable. For example, an airline's scheduled flight may not be able to be completed by an aircraft with mechanical problems or by the delayed arrival of an incoming aircraft. With access to a readily available spare aircraft equipped with non-engine drive means, the airline can continue to provide service to its departing passengers and complete the scheduled flight.

To continue to attract large numbers of passengers with low ticket prices, particularly in competitive areas, low cost carriers tend to take whatever steps they can to reduce operating costs and keep them as low as practicable to enable the carrier to operate at a profit. Fuel costs, for example, may be hedged so that fuel may be bought in advance when the cost is lower. The present invention provides a method whereby any air carrier can help keep fuel and other operating costs low while ensuring ready access to a fleet of efficiently operating aircraft available for use whenever they are needed for routine day-to-day use and/or for a backup or spare aircraft supply when an aircraft requires maintenance or is otherwise unavailable.

The method of the present invention, while intended to apply primarily to low cost carriers, may be used by any airline, whether the airline has a fleet of newer aircraft or a fleet that is composed mainly of older aircraft or aircraft likely to require more maintenance than newer aircraft. It has been noted that the fuel efficiency and operating life of all aircraft, especially older aircraft, can be extended significantly when these aircraft are equipped with non-engine drive means that are controllable to move the aircraft autonomously on the ground without reliance on the aircraft's engines or external tow vehicles. Reducing fuel costs by not using aircraft engines may be intuitive, but the additional benefits of extended aircraft operational life are not. In accordance with the present method, the aircraft in a carrier's fleet of aircraft are all equipped with non-engine drive means.

Currently, almost all of the ground movement between landing and take off of the vast majority of aircraft is produced by the operation of one or more of the aircraft's engines to power the aircraft from the point of touchdown on a runway to a parking location at an air terminal and then from the parking location to the point of takeoff. Tow vehicles, used by many, if not most, aircraft, push the aircraft back from a gate or parking location at departure. When tow vehicles are used, the aircraft engines are turned off. Otherwise, the engines operate at full or reduced thrust levels to move the aircraft when ground movement is required. When the engines are running and aircraft movement must be restrained, the aircraft brakes are typically applied, which increases the incidence of brake damage, as it is almost impossible to apply brakes in a consistently smooth manner. Causes of airframe shocks that can ultimately result in maintenance requirements that can take an aircraft out of service, including engine operation during ground travel and the attachment of tow vehicles, are essentially eliminated when non-engine drive means, rather than an aircraft's engines, are used to move the aircraft on the ground.

In the present method, aircraft fleet ground movements are controlled by the operation of a non-engine drive means, preferably an electric drive means in an onboard drive assembly powered by an aircraft's auxiliary power unit (APU). Consequently, once the aircraft engines are shut down upon landing, they remain shut down and inoperative until the aircraft is on a runway prior to takeoff. Aircraft fuel use for this independent aircraft ground movement is reduced to the very minimal amount needed for operation of the APU. The amount of fuel normally needed to move an aircraft on the ground with one or more engines is now not needed, and significant fuel savings accompany the significantly reduced engine use. Additionally, since the engines are shut off, foreign object debris (FOD) damage to engine components is not a concern, and engines can operate efficiently with less fuel during flight. Not only is there a significantly decreased likelihood of engine damage, brake damage, and airframe damage when aircraft are moved by non-engine drive means, but large reductions in brake usage and, thus, brake replacement and maintenance are also achieved.

In accordance with the method of the present invention, aircraft are equipped with at least one drive wheel powered by a controllable onboard non-engine drive means, preferably an electric drive means capable of moving the aircraft independently as required on the ground between landing and takeoff without reliance on operation of aircraft main engines or tow vehicles. The drive means may be located to drive either one or more main landing gear wheels, one or more nose landing gear wheels, or a combination of main and/or nose landing gear wheels. Alternatively, a drive assembly and/or drive means could be located in the aircraft hold or in another suitable location within the body of the aircraft. A preferred drive assembly with electric drive means may be mounted in driving relationship with one or both of the aircraft's nose wheels to move the wheels at a desired speed and torque to drive the aircraft on the ground.

The non-engine drive means may be an electric drive means that is an electric drive motor and/or an electric drive motor assembly capable of driving a commercial sized aircraft and may be selected from any type of suitable motor known in the art. One drive means preferred for this purpose is a high phase order electric motor of the kind described in, for example, U.S. Pat. Nos. 6,657,334; 6,838,791; 7,116,019; and 7,469,858, all of which are owned in common with the present invention. A geared motor, such as that shown and described in U.S. Pat. No. 7,469,858, is designed to produce the torque required to move a commercial sized aircraft at an optimum speed for ground movement. The disclosures of the aforementioned patents are incorporated herein by reference. Any form of electric motor or other motor capable of driving an aircraft on the ground, including, but not limited to, electric induction motors, permanent magnet brushless DC motors, switched reluctance motors, hydraulic pump/motor assemblies, and pneumatic motors may also be used as a non-engine drive means. Other motor designs capable of high torque operation across a desired speed range that can be integrated into an aircraft drive wheel assembly to drive an aircraft independently on the ground as described herein may also be suitable for use in maintaining a supply of aircraft as described herein.

Retrofitting an existing aircraft with an electric drive assembly as described herein can further increase the useful and economic life of older aircraft as indicated, which may allow a LCC and/or an MRO to capture operating and other savings. It is estimated that the efficiencies possible when aircraft in a fleet are equipped with non-engine drive means should add at least 5 years, and likely more than a decade, to the economic life of a commercial aircraft. Therefore, it will now be economically more attractive and cost effective to low cost and other carriers to continue to fly an older aircraft that has been retrofitted and equipped with a non-engine drive means than to purchase a new aircraft.

The term "older aircraft," as used herein, is well understood in the art and refers to aircraft that are operating near the end of or beyond the number of years usually considered the useful life of the particular aircraft. The specific number of years of useful life may vary for different types of aircraft. The median age for aircraft useful life has been found to be in the range of about 30 to 35 years. Most aircraft considered to be older aircraft are generally about 20 or more years old.

To illustrate the extended economic life of an aircraft possible, consider that, according to the Boeing Company, a new fitted out Boeing 737-800 presently has an average list price of about US$89.1 million. One of these aircraft may easily be fitted out to list for over US$100 million, which is the average cost of a 737 MAX 8. This represents a substantial investment for a low cost carrier or for any other airline. Substantial real savings may be realized by keeping an existing aircraft flying for an additional 5 or 10 years beyond what may be considered its useful life by equipping the aircraft with the non-engine drive means described above. If the existing aircraft is kept in the fleet another 10 years, the savings from not making the investment in a new aircraft (assuming a US$70 million purchase price) at a cost of money of 5% is about US$3.5 million per year, if no principal payments are made. This amounts to a total savings of US$35 million over the ten years. The present discounted value of an income stream of US$3.5 million for 10 years at a 20% discount rate is worth approximately US$15 million. If the purchase is put off for only 5 years, this, then, is a direct savings of US$17.5 million. At a 20% discount rate, the present discounted value of this savings is over US$10 million. This compares with an industry figure of about US$4 million per year resulting from postponing the purchase of a new 737NG. Avoiding the purchase of a new aircraft and keeping an existing aircraft flying for an additional 5 or 10 years clearly produces substantial real savings, including savings resulting from no depreciation on an aircraft that did not have to be purchased. These savings are valuable to all airlines and are particularly valuable to low cost carriers. The foregoing savings are realized in addition to reduced fuel costs savings achieved by not operating aircraft engines to move aircraft on the ground.

The method of the present invention takes advantage of the significant cost savings possible when older aircraft in the fleets of low cost carriers are equipped with non-engine drive means for autonomous ground movement, and a supply of these aircraft is maintained so that an aircraft is always available for use by these carriers. A beneficial working relationship may be established between one or more low cost carriers or other airlines and a maintenance, repair, and overhaul (MR0) supplier to ensure that a supply of spare or backup aircraft equipped with non-engine drive means is available when needed by an airline. The present method will be described as it applies to low cost carriers, but the method and its variations could also be used by any kind of air carrier, including, but not limited to, legacy passenger carriers, air freight carriers, and the like. The use of the terms "low cost carrier" and "LCC" is intended to also include any passenger, freight, or other airline or air carrier. Maintenance, repair, and overhaul providers (MROs) currently perform the tasks their name describes and assume responsibility for the maintenance, repair, and overhaul of aircraft as arranged by various entities, for example, airlines, aircraft manufacturers, aircraft parts manufacturers, and others.

In one aspect of the present method, one or more airlines have a core fleet of aircraft equipped with non-engine drive means. An MRO provides and maintains a similarly non-engine drive means-equipped reserve fleet of aircraft, which, in the case of LCCs, are likely to be older aircraft, in selected geographic locations available and ready to be used. The reserve aircraft, which are operated by the MRO, may be available as spare or backup aircraft for a range of LCCs and/or other carriers representing multiple airlines. In this aspect of the present method, aircraft utilization risk is pooled. A single entity may be formed to handle this business.

In another aspect of the present method, operation of an airline can essentially be shared with an MRO. This arrangement approaches the operation of a scheduled airline with subcontractors handling all of the tasks required to operate the airline. An LCC, or other type of carrier, assumes responsibility, for example, for marketing, sales, and ticket operations. The MRO provides non-engine drive means-equipped aircraft and pilots experienced with controlling the drive means to drive these aircraft on the ground to achieve the extended aircraft life, fuel savings, and fast turnaround benefits possible with such aircraft. The use of removable airline logos that can be easily changed enables the MRO to make the same aircraft available to different airlines. Alternatively, all aircraft provided in accordance with the foregoing method could be labeled with a neutral name or an abbreviation representing a neutral name. To illustrate, since a non-engine drive means preferred for use in the present method is identified by the name WHEELTUG®, aircraft provided pursuant to the present method could be identified by the name WHEELTUG AIR, or by WTA.

The roles that the MRO assumes in the present method of maintaining a supply of available aircraft equipped with non-engine drive means for use by LCCs and/or other air carriers will expand beyond those that MROs currently assume. In the present method, an MRO potentially has a global reach and may effectively become an air operator certificate holder (AOC) for one or more airlines. In one possible business model based on the present method, the MRO/AOC would provide an LCC or other carrier with an aircraft crew, maintenance, and insurance (ACMI) type of wet lease. Alternatively, there may be situations in which a dry lease would work better, and the LCC would supply its own crew. There are many possible permutations of LCC (or other carrier)/MRO arrangements that would work and are contemplated to be within the scope of the present invention.

Additionally, if the MRO offers its supply of non-engine drive means-equipped aircraft to multiple airlines that operate in different countries, the MRO is likely to be required to comply with requirements of various national aviation authorities. Continuous airworthiness management requirements are an example.

To ensure that an MRO can maintain an adequate supply of non-engine drive means-equipped aircraft readily available for use in geographic locations where they are likely to be needed by one or more LCCs requires a system for keeping track of where available aircraft are as well as their readiness for service. It is contemplated that a computer-based system such as those presently used in tracking aircraft availability and locations for aircraft charter services and the like could be adapted for this purpose. One such system is described by Aubin et al in U.S. Patent Application Publication No. US2009/0216746, the disclosure of which is incorporated herein by reference. Any system used in connection with the present method will need to include additional data beyond the aircraft availability data of the Aubin et al system that relates specifically to the LCC and MRO relationship, such as, for example, the type of lease arrangement and other information relevant to the arrangements between the MRO and the LCC. Suitable software and processors capable of tracking aircraft identified as in a pool awaiting maintenance or repairs, as well as aircraft identified as available to be transferred to an airline for active service may be accessed by each of the participating LCCs and MROs. Such software and processors may be designed to store and process information relating to providing, servicing, maintaining, and pre-positioning a pool of spare aircraft to enable a MRO to supply aircraft automatically to an LCC so that the LCC can provide service cost effectively without interruption.

FIG. 1 presents a diagrammatic representation of one embodiment of a possible relationship between an MRO and two different LCCs. As noted above, the present method can be used effectively to provide a pool of spare and standby aircraft for any airline or air carrier. In this relationship, the MRO, represented at 10, receives aircraft needing maintenance, which could be regularly scheduled maintenance, repair, or overhaul from LCC-1, represented at 20, and/or from LCC-2, represented at 30. The out-of-service aircraft waiting for maintenance, repair or overhaul are represented at 40. The MRO arranges for and ensures that all required maintenance, repair, or other work is performed on the aircraft 40 so that they are ready to return to service. A pool of aircraft ready to return to service is represented at 50. The pool of aircraft 50 may be located in a geographic location selected for its convenience to the LCC, to the MRO, or to both. Only three aircraft are shown in pool 40 and pool 50 solely for purposes of illustration. It is contemplated that any number of aircraft might make up a pool of aircraft needing MRO services or a pool or available serviced aircraft. In accordance with the present method, all of the aircraft in pool 40 and in pool 50 may be equipped with non-engine drive means for autonomous ground movement.

Other considerations for selecting a geographic location for a pool of aircraft, such as pool 50, that are ready and available for use by an LCC or other carrier may also be used. Because the MRO in this example has a relationship with two different LCCs, removable identifying logos may be used so that whichever LCC needs a spare aircraft first can be supplied with an available aircraft to which its logo can be applied without waiting for a specific aircraft with a permanent logo. Alternatively, aircraft supplied by the MRO could bear a neutral name and/or logo. It is contemplated that the information needed to carry out the process represented in FIG. 1 will optimally be included in a computer-based system, as discussed above, with appropriate software that enables the MRO and the LCCs to monitor the process so that a supply of non-engine drive means-equipped aircraft may be made available by the MRO to the LCCs as soon as aircraft are needed. The present method may be used by an MRO to supply LCCs and/or other air carriers with backup and spare aircraft when needed or to supply all of the aircraft required for service by a carrier.

The method for maintaining a supply of available aircraft equipped with non-engine drive means for low cost carriers and other airlines described herein has been described with respect to preferred embodiments. Other, equivalent, processes and methods are also contemplated to be within the scope of the present invention.

INDUSTRIAL APPLICABILITY

The method of the present invention will find its primary applicability where it is desired to provide and maintain at selected geographic locations a supply of non-engine drive means-equipped aircraft ready for service for one or more low cost carriers or other airlines through an arrangement between a maintenance, repair, and overhaul provider and the carrier that is designed to ensure that aircraft are available when needed.

The invention claimed is:

1. A method that ensures access to and availability of a supply of older aircraft retrofitted with landing gear wheel-mounted electric drive assemblies and enables a low cost airline carrier with a fleet of older aircraft retrofitted with the landing gear wheel-mounted electric drive assemblies to continue to provide air transport service with minimal interruption, comprising:
 a. providing a core fleet of older aircraft in a low cost airline carrier's fleet of aircraft retrofitted with electric drive assemblies integrated within nose or main landing gear wheels controllable to move the retrofitted older aircraft on the ground;
 b. providing a reserve pool of spare older aircraft having an identifying name and logo of the low cost airline carrier and having neutral identifying names or logos retrofitted with the electric drive assemblies integrated within the nose or main landing gear wheels in at least one geographic location accessible to the low cost airline carrier, and maintaining the reserve pool of spare retrofitted older aircraft in the at least one geographic location ready for service when needed by the low cost airline carrier by a maintenance, repair, and overhaul provider;
 c. transferring the retrofitted older aircraft in the low cost airline carrier's core fleet needing servicing to the at least one geographic location, replacing the retrofitted older aircraft needing servicing with a spare retrofitted older aircraft from the reserve pool having the identifying name and logo of the low cost airline carrier, and continuing to provide service by the low cost airline carrier with the spare retrofitted older aircraft; and
 d. servicing the retrofitted older core fleet aircraft by the maintenance, repair, and overhaul provider and maintaining the serviced retrofitted older core fleet aircraft in the at least one geographic location ready for use when needed by the low cost airline carrier.

2. The method of claim 1, further comprising providing a computer-based system comprising a processor and software at the at least one geographic location operable to obtain, process, store, and communicate information relating to the condition ready for operation and availability of each of the reserve pool of spare older aircraft retrofitted with the electric drive assemblies, and storing, processing, and communicating the processed information to the low cost airline carrier and to the maintenance, repair, and overhaul provider at the at least one geographic location.

3. The method of claim 2, further comprising providing core fleets of the retrofitted older aircraft for multiple low cost airline carriers, providing reserve pools of spare older aircraft having identifying names and logos of the multiple low cost airline carriers retrofitted with the electric drive assemblies integrated within the nose or main landing gear wheels, maintaining the reserve pools of retrofitted older aircraft ready for service when needed by maintenance, repair, and overhaul providers at multiple geographic locations, and storing, processing, and communicating the processed information to the multiple low cost airline carriers and to the maintenance, repair, and overhaul providers at the multiple geographic locations.

4. The method of claim 3, further comprising automatically communicating the processed information relating to the spare retrofitted older aircraft ready for service to the multiple low cost airline carriers in the multiple geographic locations.

5. The method of claim 3, further comprising identifying ready for operation and available the spare retrofitted older aircraft in the reserve pools at one of the multiple geographic locations for efficient transfer to one of the multiple low cost airline carriers with a core fleet of the retrofitted older aircraft located in a different geographic location needing replacement retrofitted older aircraft, and transferring the replacement retrofitted older aircraft to the one low cost airline carrier in the different geographic location.

6. The method of claim 1, further comprising providing the spare retrofitted older aircraft from the reserve pool of retrofitted aircraft having a neutral name or logo that is different from the name and identifying logo of the low cost carrier airline core fleet.

7. The method of claim 5, further comprising providing identifying logos of the multiple low cost airline carriers that are removable, and, when a first available spare retrofitted aircraft has an identifying logo different from the identifying logo of the low cost airline carrier needing the spare, applying the removable identifying logo of the low cost airline carrier to the first available spare retrofitted aircraft, and continuing service with the temporarily identified available spare aircraft without waiting for a spare retrofitted aircraft having a permanent identifying logo for the low cost airline carrier.

8. The method of claim 1, further comprising:
a. providing core fleets of retrofitted older aircraft in other airline carriers' fleets of aircraft;
b. providing reserve pools of serviced spare retrofitted older aircraft having identifying names and logos of the other airline carriers and having the neutral identifying names and logos in the at least one geographic location accessible to the other airline carriers and maintaining the reserve pools of serviced spare retrofitted older aircraft ready for service when needed; and
c. transferring the other airline carriers' retrofitted older aircraft needing servicing to the at least one geographic location, replacing the retrofitted older aircraft needing servicing with serviced spare retrofitted older aircraft having the other airline carriers' identifying name and logo from the reserve pools, and continuing to provide service by the other airline carriers with the spare retrofitted older aircraft.

\* \* \* \* \*